United States Patent [19]

Stansbury et al.

[11] 4,058,402
[45] Nov. 15, 1977

[54] WATER SOLUBLE RODENT REPELLENT COMPOSITION FOR PROTECTING A BURIED MATERIAL SUCH AS A CABLE

[75] Inventors: Roy E. Stansbury; James A. Shotton, both of Bartlesville, Okla.

[73] Assignee: Phillips Petroleum Company, Bartlesville, Okla.

[21] Appl. No.: 164,934

[22] Filed: July 21, 1971

Related U.S. Application Data

[62] Division of Ser. No. 861,175, Sept. 25, 1969, Pat. No. 3,643,450.

[51] Int. Cl.$^2$ .............................................. C09D 5/14
[52] U.S. Cl. ............................. 106/16; 260/30.8 DS; 260/32.6 R
[58] Field of Search ........................ 106/15 AF, 16–18, 106/194; 424/30, 300, 32, 33, 34; 260/32.6 R, 30.8 DS

[56] References Cited

U.S. PATENT DOCUMENTS

| | | | |
|---|---|---|---|
| 2,460,376 | 2/1949 | Caprio | 106/15 AF |
| 2,862,850 | 12/1958 | Goodhue | 424/300 X |
| 2,924,554 | 2/1960 | Manzelli | 167/46 |
| 2,933,429 | 4/1960 | Wicker et al. | 167/46 |
| 2,992,969 | 7/1961 | Roberts et al. | 167/46 |
| 3,080,350 | 3/1963 | Imai | 260/30.8 DS |
| 3,139,379 | 6/1964 | Miller | 167/46 |
| 3,165,488 | 1/1965 | Itoi | 260/30.8 DS |
| 3,222,158 | 12/1965 | Sowa | 106/15 AF |
| 3,232,007 | 2/1966 | Boatwright | 47/48.5 |
| 3,259,643 | 7/1966 | Nash | 106/15 AF X |
| 3,399,991 | 9/1968 | Littler | 424/322 |
| 3,426,133 | 2/1969 | Shotton | 424/30 |
| 3,448,586 | 6/1969 | Mailen et al. | 61/72.1 X |
| 3,503,800 | 3/1970 | Eday | 61/72.1 X |
| 3,516,960 | 6/1970 | Martins | 260/32.6 R |
| 3,615,744 | 10/1971 | Yokoo | 106/15 AF |
| 3,615,798 | 10/1971 | Woodruff | 106/282 X |
| 3,643,450 | 2/1962 | Stansbury et al. | 424/30 X |

FOREIGN PATENT DOCUMENTS

744,993  2/1953  United Kingdom .................. 424/30

OTHER PUBLICATIONS

Crown Zellerbach's Product Information Bulletin No. 326-3, "Dimethyl Sulfoxide (DMSO) Pesticide Solvent," Aug. 1961.

*Primary Examiner*—Paul R. Michl

[57] ABSTRACT

A water soluble rodent repellent composition which can be coated onto a material, e.g., a cable, which is laid into the ground. Ground moisture dissolves the composition, forming in the earth surrounding the cable a rodent repellent barrier thus preventing contact of the rodent with the cable or material. Any rodent repellent in a water soluble or water dispersible composition can be used. Specifically mentioned in the disclosure as now preferred effective rodent repellents are N,N-dialkyl sulfenyl dithiocarbamates, e.g., the N,N-dimethylsulfenyl dithiocarbamates, N,N-dimethyl-S-methylsulfenyl dithiocarbamate and N,N-dimethyl-S-tert-butylsulfenyl dithiocarbamate. The repellent is combined with dimethylsulfoxide and polyvinylalcohol or it is combined with one of dimethylsulfoxide and dimethylformamide, and with a hydroxyalkyl cellulose, e.g., hydroxypropylmethyl cellulose.

6 Claims, No Drawings

WATER SOLUBLE RODENT REPELLENT COMPOSITION FOR PROTECTING A BURIED MATERIAL SUCH AS A CABLE

This is a divisional of Ser. No. 861,175, filed Sept. 25, 1969, now U.S. Pat. No. 3,643,450 issued Feb. 22, 1972.

This invention relats to protecting a buried material such as a cable or conduit against rodent damage. It also relates to the protected material, e.g., a cable or conduit protected against rodent damage.

In one of its concepts the invention provides a composition for the protection of a buried material, as herein described, for exmple, an electric cable subject to damage by rodents, e.g., pocket gophers, by adding to or coating the composition upon the cable the composition being a water soluble or water dispersible rodent repellent composition.

Buried materials such as cables have been protected from rodent damage by addition or incorporation of a repellent to or in the outer surface of a cable. When the repellent is added to the surface of the cable, during its manufacture, some damage may, on occasion, be done by the rodent before the repellent drives him away. This is because the rodent must attack the cable to sense the repellent.

In U.S. Pat. No. 3,448,586, issued June 10, 1969, Tyson H. Mailen, there is described and claimed a method for protecting against rodent damage a rodent damageable material which has been buried in the ground which comprises adding to the soil adjacent said material a material repellent to said rodent. In the patent are mentioned the rodent repellents which in this application are now preferred.

It has now been appreciated that in spite of the advantages of treating the soil to protect a buried cable or other material which is to be protected against rodent damage, upon occasion disadvantages exist. The cable often will not end up in the treated soil and/or the person treating the soil for some reason does not accomplish a proper treatment thereof, for example, skips an area due to malfunctioning of the treating machine or method. Other reasons for failure to properly treat the soil to protect completely the buried object will be understood by those in possession of this disclosure.

We have now discovered a composition for treating the soil adjacent to a buried object, e.g., an electric cable, to be protected against rodent damage which when added to or coated upon the object will be dissolved or dispersed into the soil, owing to a condition of the soil, for example, owing to moisture contained therein and thus disperse the rodent repellent into the soil surrounding the object or cable. We have conceived that a water soluble or water dispersible rodent repellent composition can be coated upon the cable sometime prior to closing in the cable into the ground or trench. Shortly after burial the repellent is found to have permeated into the soil surrounding the buried cable forming a complete barrier preventing rodents from approaching close enough to the cable to gnaw thereon.

An object of this invention is to provide protection for a buried object to be protected against rodent damage. Another object of the invention is to provide a composition which will protect an object against rodent damage. Still another object of the invention is to protect a buried cable such as an electric cable or conduit against rodent damage. A further object of the invention is to so prepare an object to be buried in the ground that it will upon being in the ground a relatively short time release into the ground a rodent repellent material forming a complete barrier around said object. A still further object of the invention is to so place into the ground surrounding a buried object or cable or conduit a rodent repellent that a rodent repellent barrier will be formed in the ground in a manner such that the repellent burrier will be complete and will not have any places in it which a rodent will be able to traverse.

Other aspects, concepts and objects of the invention are apparent from a study of this disclosure and the appended claims.

According to the present invention there is provided composition for protecting a buried material such as an electric cable or conduit against pests or rodent damage which is a water dispersible composition containing a rodent repellent such as to permit ground moisture to remove from the cable into the ground the composition, which has been placed thereon, in a manner to form a rodent repellent barrier in the ground surrounding said cable, thereby preventing the rodent from coming into physical contact with the cable.

If the cable, conduit or buried object is being installed in a relatively arid section, sufficient moisture can be applied to the trench and backfill surrounding the buried object to initiate and/or to complete the process of forming the repellent barrier.

It will be appreciated by one skilled in the art in possession of this disclosure, having studied the same, that the compositions which can be applied to the object to be protected in the ground can be variously compounded. For best results certain criteria should be observed. The repellent should be long-lasting at the place at which it is to form the rodent repellent barrier. Though it must not be readily washed away by ground waters, the composition should be such that it is reasonably quickly released from its position as a coating upon the cable or object so as to protect the object against early rodent attack.

The composition can be made up of soluble and insoluble discrete particles so that soluble particles release insoluble particles or amounts of permanently disposed repellent. Agents which aid in the dispersal or dissolution of the overall rodent repellent composition thus causing it to migrate into the soil around the buried object or cable can be used. Essentially then a concept of the invention is in placing upon the object or cable a substantially complete coating of repellent composition of a character and in a manner such that the composition will release to render it effective against rodents a repellent barrier all around or surrounding the buried object or cable.

A rodent repellent which is now preferred to be included in the composition is one described in U.S. Pat. No. 2,862,850, issued Dec. 2, 1958, Lyle D. Goodhue. The repellent there described is an N,N-dialkyl sulfenyl dithiocarbamate, more specifically, an N,N-dimethylsulfenyl dithiocarbamate, for example, N,N-dimethyl-S-methyl-sulfenyl dithiocarbamate and N,N-dimethyl-S-tert-butylsulfenyl dithiocarbamate.

The respective amounts of repellent and/or other ingredient in the composition to be placed upon the cable can be determined by routine testing.

Tests have been made against gophers and have been shown to provide complete effective protection. In one test N,N-dimethyl-S-tert-butylsulfenyl dithiocarbamate was formulated so that it could be readily applied to a cable or structure and upon such application was normally dry and non-tacky but when moist would slowly release the repellent to surround a treated object with a space-repellent to rodent, i.e., a rodent repellent barrier was formed. No injury to the treated object could occur because the object was, in effect, repellent to rodents at a distance. The rodents would not penetrate the barrier.

Thus, according to a concept of the invention the coating upon the cable will create its own volume of repellent space in the presence of moisture.

Water soluble coatings for buried cables are now preferred but it will be understood that compositions which otherwise permeate the repellent into the soil to create the rodent repellent barrier are within the scope of the claims.

The compositions used in the examples herein given are soluble emulsion coating compositions.

EXAMPLE

EXAMPLE

Formulation 1

| | | |
|---|---|---|
| Dimethylsulfoxide | 50 ml. | 82.7% by weight |
| N,N-dimethyl-S-tert-butylsulfenyl dithiocarbamate | 8 gms. | 10.6% by weight |
| Polyvinylalcohol | 5 gms. | 6.7% by weight |
| Total weight | 75 gms. | 100.0% |

Formulation 2

| | | |
|---|---|---|
| Dimethylsulfoxide | 50 ml. | 60.7% by weight |
| N,N-dimethyl-S-tert-butylsulfenyl dithiocarbamate | 32 gms. | 34.0% by weight |
| Polyvinylalcohol | 5 gms. | 5.3% by weight |
| Total Weight | 94 gms. | 100.0% |

The above formations were coated on a three-eights inch diameter MARLEX (trademark) tubing. This diameter tubing is small enough in diameter so that it is not physically repellent to most gophers. Tests by the Denver Wildlife Research Laboratory have shown large diameter cables of tubing are themselves deterrent to gophers. The deterrent diameter falls somewhere between one and two inches in diameter. Both formulations were applied to the tubing in the same manner. The amount of tubing used in each test was weighed. The coatings were painted on the tubing and then dried in a stream of warm air. The tubing was again weighed to determine the increase in weight. This gave close approximation to the amount of chemical deposited on the tubing. Both formulations dried to a hard coating that could be handled. The coating itself averaged 0.7 grams per lineal foot. The amount of active ingredient per lineal foot of tubing was approximately 70 milligrams for Formulation 1 and 238 milligrams for Formulation 2. The latter formulation crystallized out at room temperatures. It required warming to a temperature above 90° to dissolve and apply to the tubing.

LABORATORY TESTING

The test method used to evaluate these coatings was as follows:

A case 30 inches wide, 30 inches high and 2¼ inches deep was used. It was constructed of wood except for one of the 30 × 30 sides which was of glass. This permitted the activity of the gopher to be observed at all times. This case was filled to within 5 inches of the top with sandy soil that was partially compacted. A gopher was introduced into the case. The gopher immediately set about sealing off any air inlets to the case. When this was complete, it started burrowing into the soil. It created tunnels in the soil and eventually worked its way to the bottom of the case. In the course of a seven hour day, the gopher completed several trips digging from the top to the bottom and from the bottom to the top of the case.

When a repellent barrier is placed in the gopher's path of digging, he reacts in several ways:

1. If the barrier is soil according to the invention (2 lbs./mile rate), the gopher digs almost to the treated soil, it then plugs its burrow or tunnel and takes a course in another direction. This test cannot be continued indefinitely because the test case confines the gopher and the repellent treated soil in close quarters with each other. In tests run for 6 to 10 hours, the gophers eventually acted bewildered and did not know where to go.
2. If the barrier is a ladder arrangement made with 3/8 inch diameter tubing that is held 1 1/8 inches apart by smaller polyethylene tubing, then the gophers will dig until they encounter the tubing. All gophers attempt to dig through these spaces; however, there are individual differences in gophers and some will work harder than others in their attempt to penetrate the barrier.

Seldom does a gopher penetrate the barrier in the six to seven hours it is in the test chamber. The gophers will encounter the tubing of the ladder and cause damage by biting or chewing on the tubing in an effort to penetrate. This damage ranges from slight slashes that do not penetrate into the center of the tube, to large patches of the tubing being chewed away. Occasionally, a gopher will chew completely through a tube and penetrate the barrier.

TESTING COATING OF FORMULATION 1

Ladder-type barriers were placed in the case in the same manner as the untreated tubing except that the soil next to the tubing was dampened and let stand for 24 hours, then a gopher was introduced into the test chamber. The soluble coating then was tested. The gopher dug until it came to within approximately one inch of the tubing. This was almost to the dampened soil. It then stopped digging, plugged its burrow and started digging in another direction. During the course of the day, the gopher encountered the dampened soil, now treated with repellent, a total of seven times. During a six hour period, the gopher never contacted the tubing itself. The gopher was removed and the soil in the case compacted. The lid of the case was left open so any vapors from the active ingredient could escape. The next day another gopher was introduced into the case and essentially the same performance was observed. The gopher never encountered the tubing itself. This gopher came in contact with the dampened soil five times during the day.

TESTING COATING OF FORMULATION 2

The tubing was arranged to form the usual barrier in the test case. As with the earlier test, the soil surrounding the tubing was dampened and let stand for 24 hours before a gopher was put in the case. Then a gopher was introduced into the case. The gopher encountered the first barrier in less than 30 minutes. The gopher dug to within 1 ½ inches of the tubing then stopped. It then plugged the tunnel and came to the top of the case. The gopher spent considerable time on top of the soil. The gopher again dug to the barrier and again returned to the top of the case.

CONCLUSION

The two formulations of the water soluble coating for underground cable or tubing were tested satisfactorily against gophers. These formulations prevented the gopher from encountering the tubing itself. Thus, no damage to the tubing occurred. The laboratory tests show that formulations such as tested are effective and can be employed to protect buried cables against rodents.

The following are some of the advantages for water soluble or dispersible coatings for buried objects or cables.
1. The coating (treatment) is made at the factory; thus, every foot of cable is treated and better controls over the application can be exercised.
2. The coating is applied to the outside of the cable; thus, it is readily available to the repellent. This is to be distinguished from incorporating the repellent into the cable covering.
3. The coating, being water soluble, is dissolved by the ground moisture and seeps into the soil. This provides a treated soil barrier that stops pocket gophers before they reach the cable jacket itself.

In somewhat different formulations it is possible to use such additives as a hydroxyalkyl cellulose, e.g., hydroxypropylmethyl cellulose. Other hydroxyalkyl cellulose material can be used. Other alcohols and methylalcohol can be used. Methylalcohol is now preferred because it evaporates readily at ambient temperature.

FORMULATION 3

In another formulation 3 grams of hydroxypropylmethyl cellulose (Methocel HG), 3 grams of N,N-dimethyl-S-tert-butylsulfenyl dithiocarbamate and 125 ml. of methylalcohol were stirred together. This mixture was applied to MARLEX tubing as before to provide a slow release water soluble coating of rodent repellent.

| Formulation 4 | | |
|---|---|---|
| Dimethylformamide | 125 ml. | |
| N,N-dimethyl-S-tert-butylsulfenyl dithiocarbamate | 3 g. | |
| Methyl cellulose (cellosolve) | 3 g. | (25 cp solution)* |

*Solution 25 centipoise flow rate

| Formulation 5 | | |
|---|---|---|
| Dimethylsulfoxide | 125 ml. | |
| N,N-dimethyl-S-tert-butylsulfenyl dithiocarbamate | 3 g. | |
| Methyl cellulose | 3 g. | (25 cp solution)* |

*Solution 25 centipoise flow rate

The actual test results reported herein show that no damage occurred to the tubing and that the formulations are, therefore effective and can be employed in protecting buried cables.

The repellent will usually be from about 1 to 45 percent by weight of the composition, the solubilizing ingredient, e.g., dimethylsulfoxide, will be in preponderance in the remainder of the composition and the remainder solvent, e.g., polyvinylalcohol will constitute substantially the rest of the composition.

The material or object which can be protected according to the present invention is one which will be buried in the ground and includes electric cables and also any buried rubber- or plastic-containing material such as conduits, barrier sheets. The term "electric cable" or "cable" is meant to include any rubber- or plastic-covered wire or conductor, such as seismograph cable, telephone cable and the like and, in fact, any rodent damageable material.

In Ser. No. 583,465, filed Sept. 30, 1966, by W. R. Eddy, there is disclosed and claimed a protected article comprising an insulated electrical conduit surrounded by a structurally stable foamed organic polymer of sufficient thickness to protect said insulated electrical conduit, said foam having rodent repellent dispersed therein.

Reasonable variation and modification are possible within the scope of the foregoing disclosure and the appended claims to the invention the essence of which is that there has been provided a method for protecting buried objects against rodent attack by coating or adding to said objects a rodent repellent composition which is taken into the soil surrounding the object when buried, owing to moisture in the soil and that such protected object such as cables or conduits have been prepared.

We claim:
1. A composition suitable for application to an object subject to rodent damage by chewing by the rodent of the object to protect said object against such damage by keeping the rodent at a distance from said object when it is buried in the ground and which upon application to said object forms thereon a solid, moisture dispersible layer which comprises in a non-aqueous, liquid solvent, a solid, water-soluble, repellent holding dispersible carrier and an effective N,N-dialkylsulfenyl dithiocarbamate rodent repellent, the rodent repellent being present from about 1-45 weight percent of the composition, the remainder of the composition consisting of said carrier and a solvent, said carrier being present in preponderance in said remainder of the composition, said non-aqueous liquid solvent being selected from the group of dimethylformamide and dimethylsulfoxide and mixtures thereof and said solid, water-soluble carrier being a hydroxyalkyl cellulose, said composition being adapted upon being acted upon by moisture in the ground to release a rodent repellent protective barrier surrounding said object.
2. A composition according to claim 1 consisting essentially of an effective N,N-dialkylsulfenyl dithiocarbamate, dimethylformamide, and hydroxyalkyl cellulose wherein the dimethylformamide is in preponderance in the composition.
3. A composition according to claim 1 consisting essentially of an effective N,N-dialkylsulfenyl dithiocarbamate, dimethylsulfoxide, and hydroxyalkyl cellulose wherein the dimethylsulfoxide is in preponderance in the composition.
4. A composition suitable for application to an object subject to rodent damage by chewing by the rodent of the object to protect said object against such damage by keeping the rodent at a distance from said object when it is buried in the ground and which upon application to said object forms thereon a solid, moisture dispersible layer which comprises in a non-aqueous, liquid solvent, a solid, water-soluble, repellent holding dispersible car- rier and an effective N,N-dialkylsulfenyl dithiocarbamate rodent repellent, the rodent repellent being present from about 1–45 weight percent of the composition, the remainder of the composition consisting of said carrier and a solvent, said carrier being present in preponderance in said remainder of the composition, said non-aqueous liquid solvent being selected from the group of dimethylformamide and dimethylsulfoxide and mixtures thereof and said solid, water-soluble carrier being methyl cellulose, said composition being adapted upon being acted upon by moisture in the ground to release a rodent repellent protective barrier surrounding said object.

5. A composition according to claim 1 consisting essentially of an effective N,N-dialkylsulfenyl dithiocarbamate, dimethylformamide, and methyl cellulose wherein the dimethylformamide is in preponderance in the composition.

6. A composition according to claim 1 consisting essentially of an effective N,N-dialkylsulfenyl dithiocarbamate, dimethylsulfoxide, and methyl cellulose wherein the dimethylsulfoxide is in preponderance in the composition.

* * * * *

UNITED STATES PATENT AND TRADEMARK OFFICE
CERTIFICATE OF CORRECTION

PATENT NO. : 4,058,402

DATED : November 15, 1977

INVENTOR(S) : Roy E. Stansbury et al

It is certified that error appears in the above-identified patent and that said Letters Patent are hereby corrected as shown below:

Column 8, line 3, "1" should be --- 4 --- and line 8, "1" should be --- 4 ---.

Signed and Sealed this

Second Day of May 1978

[SEAL]

Attest:

RUTH C. MASON
Attesting Officer

LUTRELLE F. PARKER
Acting Commissioner of Patents and Trademarks